(12) United States Patent
Cotoros et al.

(10) Patent No.: US 11,523,035 B2
(45) Date of Patent: Dec. 6, 2022

(54) LENS WATER DISPERSION

(71) Applicant: GoPro, Inc., San Mateo, CA (US)

(72) Inventors: Ingrid Cotoros, San Mateo, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 123 days.

(21) Appl. No.: 17/043,284

(22) PCT Filed: Mar. 29, 2019

(86) PCT No.: PCT/US2019/024877
§ 371 (c)(1),
(2) Date: Sep. 29, 2020

(87) PCT Pub. No.: WO2019/191612
PCT Pub. Date: Oct. 3, 2019

(65) Prior Publication Data
US 2021/0051252 A1  Feb. 18, 2021

Related U.S. Application Data

(60) Provisional application No. 62/651,089, filed on Mar. 31, 2018.

(51) Int. Cl.
*H04N 5/225* (2006.01)
*G03B 17/08* (2021.01)
*G02B 1/18* (2015.01)

(52) U.S. Cl.
CPC ........... *H04N 5/2254* (2013.01); *G03B 17/08* (2013.01); *G02B 1/18* (2015.01)

(58) Field of Classification Search
CPC .... H04N 5/2254; G02B 1/18; G02B 27/0006; G03B 17/08; G03B 37/04; G03B 17/00; G03B 17/12
See application file for complete search history.

(56) References Cited

U.S. PATENT DOCUMENTS

| 5,990,377 A | 11/1999 | Chen |
| 8,425,058 B2 * | 4/2013 | Nomura ............. G02B 27/0006 359/507 |
| 2017/0139310 A1 * | 5/2017 | Yasuda .................... G02B 1/18 |

FOREIGN PATENT DOCUMENTS

JP  2000169258 A  6/2000

OTHER PUBLICATIONS

International Search Report and Written Opinion for PCT/US2019/024877, dated Aug. 22, 2019, 10 pages.

(Continued)

*Primary Examiner* — Lin Ye
*Assistant Examiner* — John H Morehead, III
(74) *Attorney, Agent, or Firm* — Young Basile Hanlon & MacFarlane, P.C.

(57) ABSTRACT

Systems and methods are disclosed for lens water dispersion. For example, an image capture device may include a lens mounted on a body of the image capture device; an image sensor mounted within the body, behind the lens and configured to capture images based on light incident on the image sensor through the lens; and a dispersion structure around a perimeter of the lens on an external surface of the body, wherein the dispersion structure includes gaps sized to cause capillary action to move water away from the lens, from a first edge of the dispersion structure to a second edge of the dispersion structure.

20 Claims, 11 Drawing Sheets

(56) References Cited

OTHER PUBLICATIONS

Shkolnikov et al., "Design and fabrication of porous polymer wick structures", Sensors and Actuators B 150 (2010) 556-563.
International Preliminary Report on Patentability and Written Opinion for App. No. PCT/US2019/024877, dated Oct. 15, 2020, 8 pages.

* cited by examiner

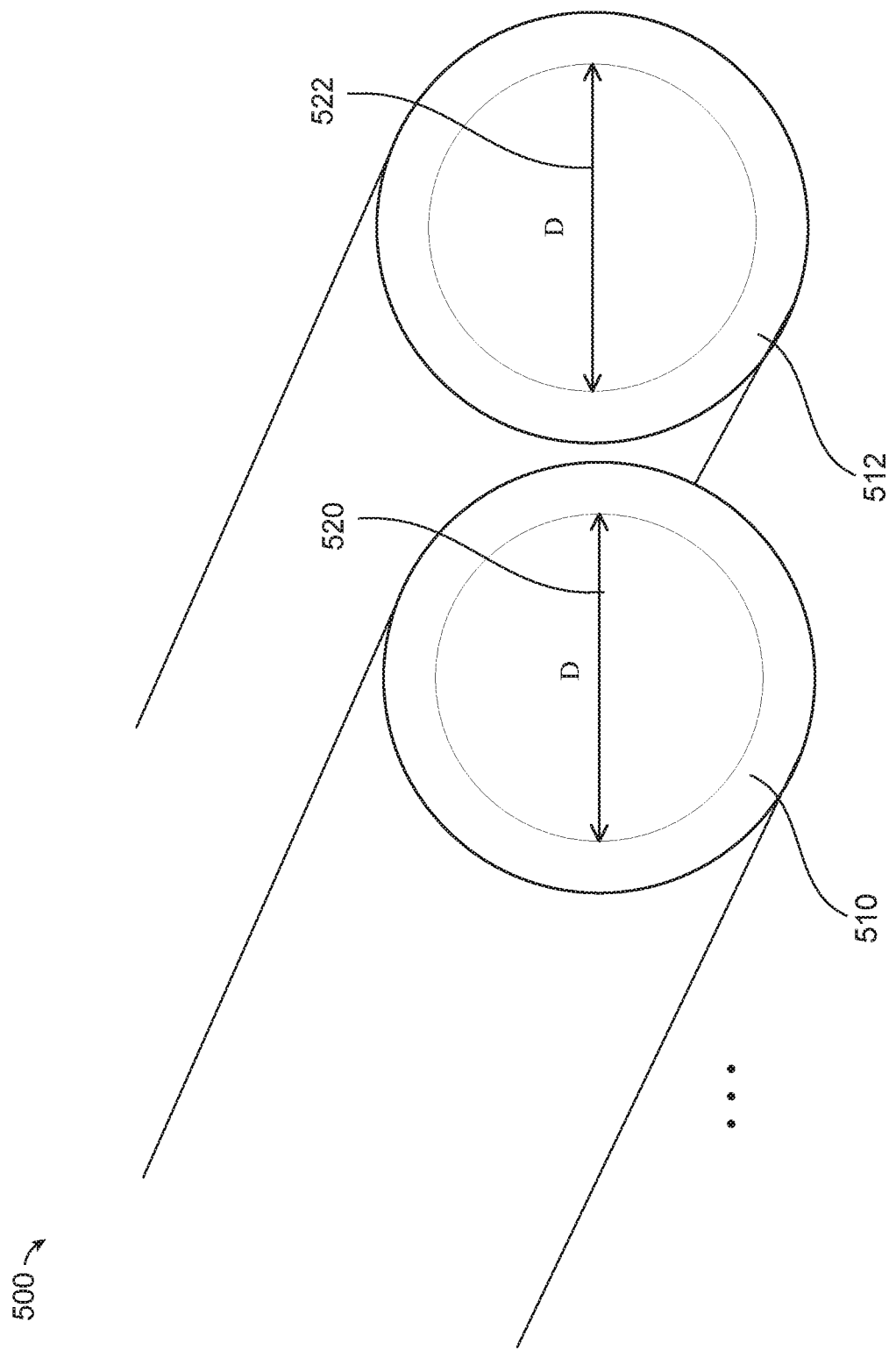

LENS WATER DISPERSION

CROSS-REFERENCE TO RELATED APPLICATIONS

This application is a 371 of International Application No. PCT/US2019/024877 filed on Mar. 29, 2019, which claims the priority to U.S. Provisional Application No. 62/651,089, filed on Mar. 31, 2018, the entire disclosures of which are hereby incorporated by reference.

TECHNICAL FIELD

The present disclosure relates to lens water dispersion.

BACKGROUND

Image capture devices, such as cameras, may capture content as images (e.g., still images or frames of video). Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. During use of an image capture device, water may appear on a surface of a lens (e.g., due to rain, splashing, or condensation). Water on a lens can refract light passing through a lens and distort images captured using the lens.

SUMMARY

The present disclosure describes, inter alia, apparatus and methods for lens water dispersion.

In a first aspect, the subject matter described in this specification can be embodied in image capture devices that include a lens mounted on a body of the image capture device; an image sensor mounted within the body, behind the lens and configured to capture images based on light incident on the image sensor through the lens; and a dispersion structure around a perimeter of the lens on an external surface of the body, wherein the dispersion structure includes gaps sized to cause capillary action to move water away from the lens, from a first edge of the dispersion structure to a second edge of the dispersion structure.

In the first aspect, the dispersion structure may include grooves on the external surface of the body and width of the grooves are sized to cause capillary action for water. In the first aspect, the dispersion structure may include tubes with a cross-sectional area sized to cause capillary action for water. In the first aspect, the dispersion structure may include a mesh with an inter-strand spacing that is sized to cause capillary action for water. In the first aspect, the dispersion structure may include a sintered powder with pores that are sized to cause capillary action for water. In the first aspect, an outer surface of the lens may be substantially hydrophilic. In the first aspect, an outer surface of the lens may be substantially hydrophobic. In the first aspect, an outer surface of the lens may have a radial hydrophobicity gradient from a center of the lens to the perimeter of the lens. In the first aspect, hydrophobicity of the outer surface of the lens may be greater in the center of the lens than at the perimeter of the lens. For example, the radial hydrophobicity gradient may be continuous. For example, the radial hydrophobicity gradient is implemented a sequence of discrete steps in hydrophobicity. In the first aspect, the image capture device may include an accumulation volume on the external surface of the body around the perimeter of the lens, between the lens and the dispersion structure. For example, the accumulation volume may be a channel around the perimeter of the lens on the external surface of the body. In the first aspect, the image capture device may include an accumulation volume on the external surface of the body around the perimeter of the dispersion structure. In the first aspect, the image capture device may include one or more gravity channels connected to the accumulation volume, that are configured to allow water to flow out of the accumulation volume under a force of gravity when the image capture device is in an appropriate orientation with respect to gravity. In the first aspect, the one or more gravity channels may include four gravity channels spaced evenly around the outer perimeter of the accumulation volume. The first aspect may include any combination of the features described in this paragraph.

In a second aspect, the subject matter described in this specification can be embodied in image capture devices that include a lens mounted on a body of the image capture device; an image sensor mounted within the body, behind the lens and configured to capture images based on light incident on the image sensor through the lens; and wherein an outer surface of the lens has a radial hydrophobicity gradient from a center of the lens to a perimeter of the lens.

In the second aspect, hydrophobicity of the outer surface of the lens may be greater in the center of the lens than at the perimeter of the lens. For example, the radial hydrophobicity gradient may be continuous. For example, the radial hydrophobicity gradient may be implemented a sequence of discrete steps in hydrophobicity. In the second aspect, the image capture device may include an accumulation volume on an external surface of the body around the perimeter of the lens, adjacent to the lens. For example, the processing apparatus may be inside the image capture module. In the second aspect, a surface of the accumulation volume may be hydrophilic relative to the outer surface of the lens. The second aspect may include any combination of the features described in this paragraph.

In a third aspect, the subject matter described in this specification can be embodied in image capture devices that include a lens mounted on a body of the image capture device; an image sensor mounted within the body, behind the lens and configured to capture images based on light incident on the image sensor through the lens; an accumulation volume on an external surface of the body around a perimeter of the lens; and a plurality of gravity channels radiating from the accumulation volume that are spaced around an outer perimeter of the accumulation volume.

In the third aspect, the plurality of gravity channels may include four gravity channels spaced evenly around the outer perimeter of the accumulation volume. In the third aspect, an outer surface of the lens may be substantially hydrophilic. In the third aspect, an outer surface of the lens may be substantially hydrophobic. In the third aspect, an outer surface of the lens may have a radial hydrophobicity gradient from a center of the lens to the perimeter of the lens. In the third aspect, hydrophobicity of the outer surface of the lens may be greater in the center of the lens than at the perimeter of the lens. For example, the radial hydrophobicity gradient may be continuous. For example, the radial hydrophobicity gradient may be implemented a sequence of discrete steps in hydrophobicity. The third aspect may include any combination of the features described in this paragraph.

These and other aspects of the present disclosure are disclosed in the following detailed description, the appended claims, and the accompanying figures.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIG. 5A illustrates an example of tubes with dimensions chosen to cause capillary action.

DETAILED DESCRIPTION

Systems and methods for lens water dispersion are described below. During use of an image capture device, water may appear on a surface of a lens (e.g., due to rain, splashing, or condensation). Water droplets on an imaging lens may degrade the quality of images captured by that lens. For example, water droplets on a lens can refract light passing through a lens and distort images captured using the lens. Depending on the size, number, and location of the water droplets, the artifacts induced may include, for example, regional blurring of the image, entire image defocus, and artifacts around a stitch line (e.g., in the case of spherical cameras). Unless there exists a mechanism to quickly and efficiently disperse the water off the surface of the lens, these problems can plague both rectilinear and fisheye camera lenses.

A system for lens water dispersion may be structured to effectively transport water away from a lens surface. The system for lens water dispersion may be passive, utilizing its topology, intermolecular forces (e.g., hydrophobicity and capillary action), and/or gravity to control the flow of water off of and away from a lens. A system for lens water dispersion may include various combinations of one or more of the following elements: First, radially varying hydrophilicity/hydrophobicity of a lens surface optimized for a product use case. For example, a highly hydrophobic coating may be used to solve large droplets issues, a highly hydrophilic coating may be used for small droplets like in foggy situations, and/or a radially varying from hydrophobic to hydrophilic surface may be used to promote water transport radially towards a perimeter of the lens. Second, a hydrophilic accumulation volume along the perimeter of the lens surface. Third, a dispersion structure that utilizes capillary action driven/hydrophilic wicking to transport water away the accumulation volume or directly from the perimeter of the lens. Fourth, an accumulation volume designed as buffer station for holding water output from the dispersion structure until it can be removed via evaporation and/or drainage channels. Fifth, gravity driven drainage channels that drain water out of the accumulation volume via the force of gravity when an image capture device including the system for lens water dispersion is in an appropriate orientation with respect to gravity.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Figure 1:
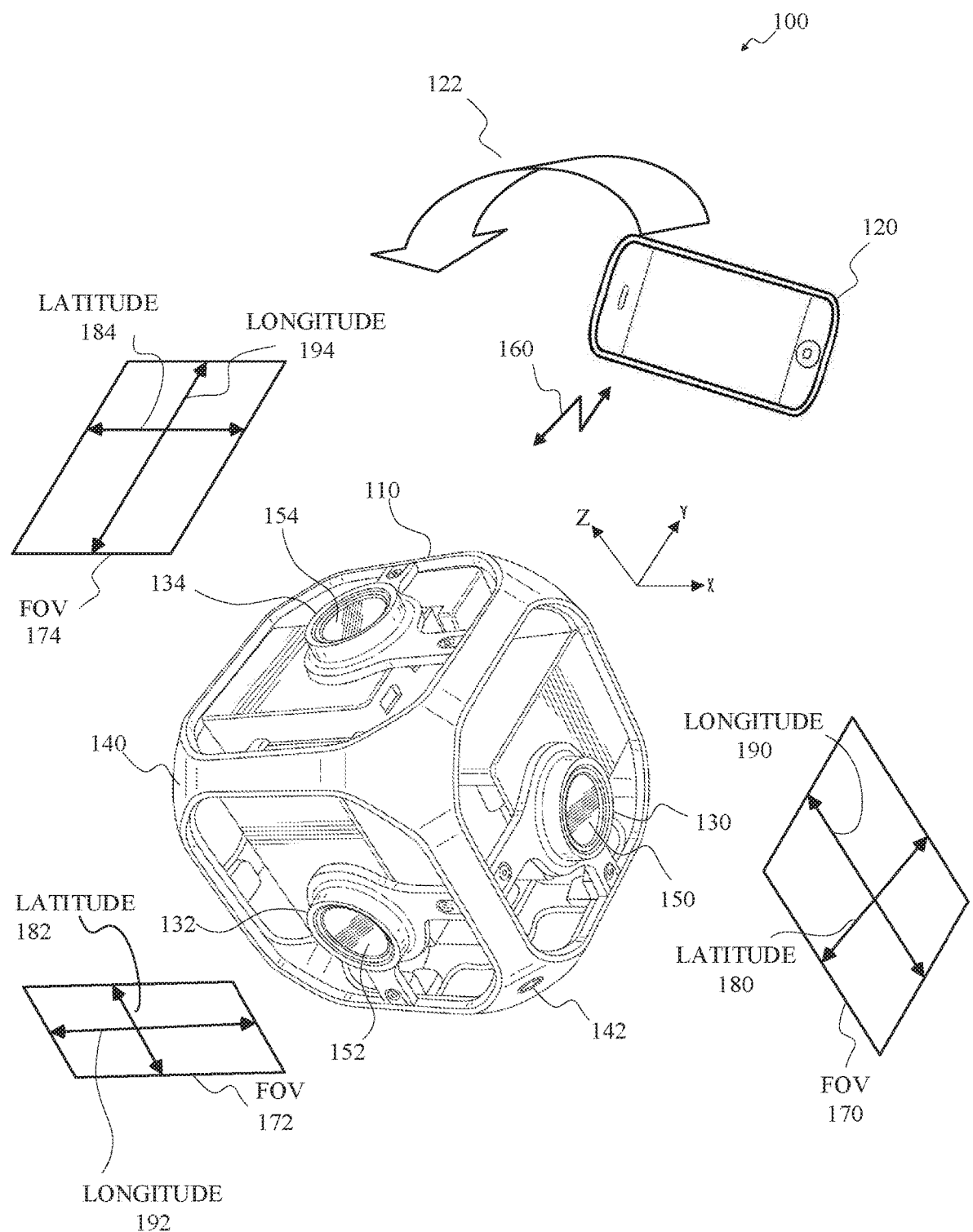
FIG. 1 is a diagram of an example of an image capture system for content capture.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a latitudinal dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, rectilinear lens, wide-angle lens, ultra-wide-angle lens, spherical lens, fisheye lens, infrared lens, ultraviolet lens, perspective control lens, other lens, and/or other optical element. In some implementations, a lens 150, 152, 154 may be a rectilinear lens and produce rectilinear field-of-view images. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

An image capture device 130, 132, 134 may include features for mitigating the effects of water on an outer surface of a lens 150, 152, 154. For example, an image capture device 130, 132, 134 may include a dispersion structure around a perimeter of a lens 150, 152, 154 on an external surface of a body of the image capture device. The dispersion structure may include gaps sized to cause capillary action to move water away from the lens. For example, an image capture device 130, 132, 134 may include water dispersion structures shown in the lens mount 400 of FIG. 4. In some implementations, an outer surface of a lens 150, 152, 154 has a radial hydrophobicity gradient from a center of the lens to a perimeter of the lens. For example, a lens 150, 152, 154 has a radial hydrophobicity gradient as shown in one of the hydrophobicity plots of FIG. 7.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2:
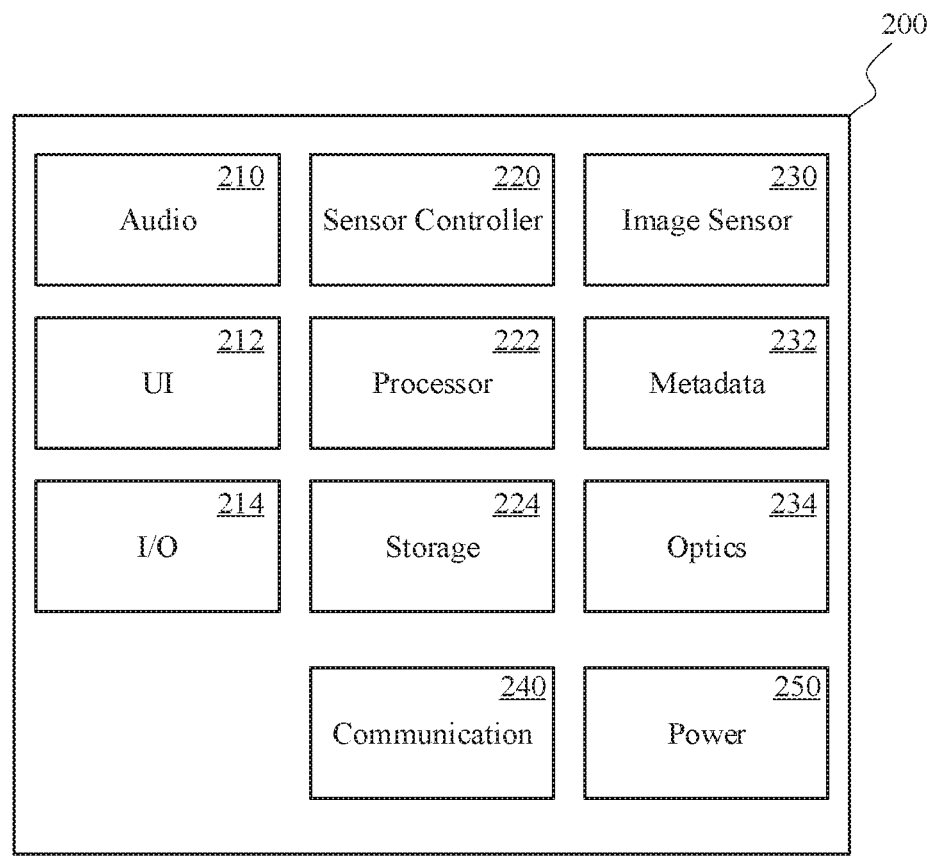
FIG. 2 is a block diagram of an example of an image capture device.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, e.g., Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats (audio codecs). In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements (e.g., buttons and/or virtual touch screen buttons), lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information (e.g., image resolution, frame rate, capture mode, sensor mode, video mode, photo mode), connection status information (e.g., connected, wireless, wired connection), power mode information (e.g., standby mode, sensor mode, video mode), information related to other information sources (e.g., heart rate, GPS), and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press (pulse width modulation), a number of button presses (pulse code modulation), or a combination thereof. In an example, a sensor acquisition mode may be initiated in response to detecting two short button presses. In another example, the initiation of a video mode and cessation of a photo mode, or the initiation of a photo mode and cessation of a video mode, may be triggered (toggled) in response to a single short button press. In another example, video or photo capture for a given time duration or a number of frames (burst capture) may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface (e.g., Wi-Fi, Bluetooth, USB, HDMI, Wireless USB, Near Field Communication (NFC), Ethernet, a radio frequency transceiver, and/or other interfaces) for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, e.g., a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, CPU, DSP, application-specific integrated circuit (ASIC), GPU, and/or other processor that may control the operation and functionality of the image capture device 200. In some implementations, the processor 222 may interface with the sensor controller 220 to obtain and process sensory information for, e.g., object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content (photo/video) captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method (e.g., H.265, H.264, CineForm, and/or other codec).

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a GPS receiver may include a processing apparatus that may provide position and/or motion information to the processor 222 in accordance with a defined schedule (e.g., values of latitude, longitude, and elevation at 10 Hz).

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content (e.g., metadata, images, audio) captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type (video, still images), image resolution, frame rate, burst setting, white balance, recording configuration (e.g., loop mode), audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an IMU, which may include one or more accelerometers and/or gyroscopes, a magnetometer, a compass, a GPS sensor, an altimeter, an ambient light sensor, a temperature sensor, and/or other sensors or combinations of sensors. In some implementations, the image capture device 200 may contain one or more other metadata/telemetry sources, e.g., image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a GPS sensor that may provide GPS coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a GPS unit as a second physical unit. In some implementations, the metadata unit 232, or one or more portions thereof, may be included in an image capture device 200 as shown, or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component (e.g., a dongle) having an infrared sensor, a radio frequency transceiver and antenna, an ultrasonic transducer, and/or other communications interfaces used to send and receive wireless communication signals. In some implementations, the communication unit 240 may include a local (e.g., Bluetooth, Wi-Fi) and/or broad range (e.g., cellular LTE) communications interface for communication between the image capture device 200 and a remote device (e.g., the user interface device 120 in FIG. 1). The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution (e.g., battery, solar cell, inductive (contactless) power source, rectification, and/or other power supply) may be used.

Consistent with the present disclosure, the components of the image capture device 200 may be remote from one another and/or aggregated. For example, one or more sensor components may be distal from the image capture device 200, e.g., such as shown and described with respect to FIG. 1. Multiple mechanical, sensory, or electrical units may be controlled by a learning apparatus via network/radio connectivity.

Figure 3A:
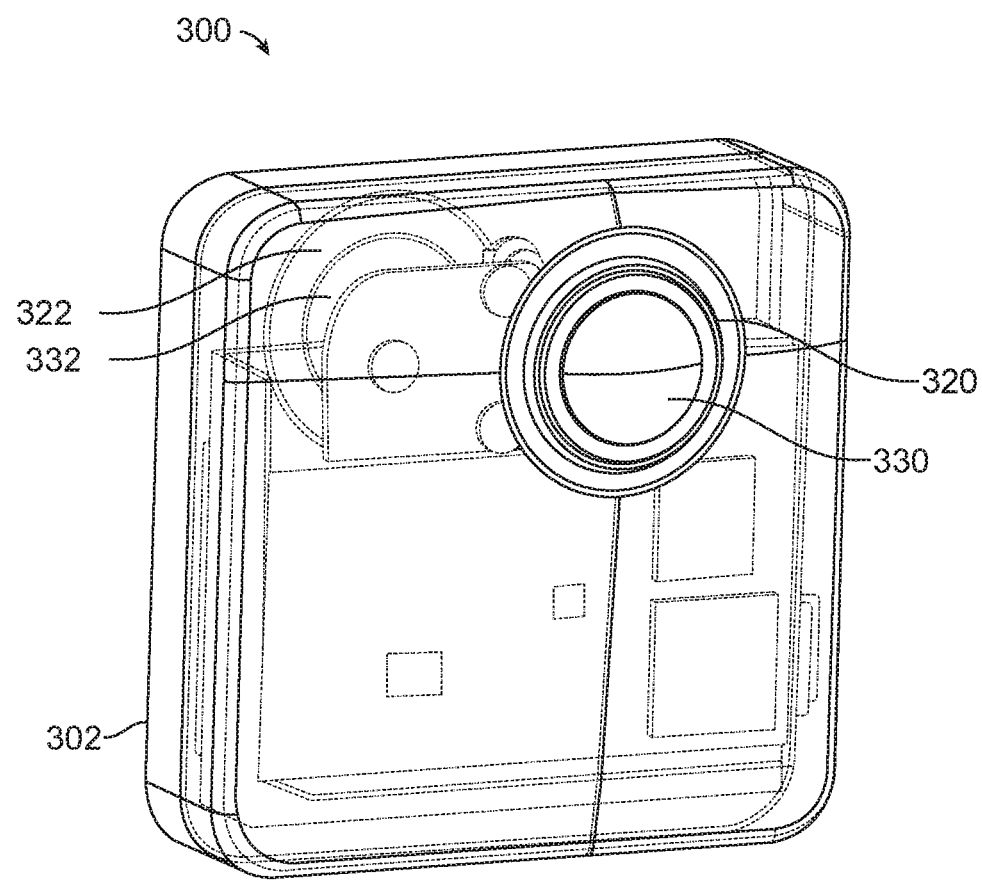
FIG. 3A illustrates a camera system capable of capturing spherical content.

FIG. 3A illustrates an image capture device 300 capable of capturing spherical content. The image capture device 300 includes a body 302 having two lenses 330 and 332 structured on front and back surfaces of the body 302, various indicators on the front and/or back surface of the camera body (such as LEDs, displays, and the like), various input mechanisms (such as buttons, switches, and touchscreen mechanisms), and electronics (e.g., imaging electronics, power electronics, etc.) internal to the body 302 for capturing images via the lenses 330 and 332 and/or performing other functions. The two lenses 330 and 332 are oriented in opposite directions and couple with two images sensors mounted on circuit boards within the body 302. Other electrical camera components (e.g., an image processor, camera SoC (system-on-chip), etc.) may also be included on a circuit board within the body 302.

The image capture device 300 may include features for mitigating the effects of water on an outer surface of the lenses 330 and 332. For example, the image capture device 300 includes a dispersion structure 320 around a perimeter of the first lens 330 on an external surface of the body 302 of the image capture device 300. For example, the image capture device 300 includes a dispersion structure 322 around a perimeter of the second lens 332 on an external surface of the body 302 of the image capture device 300. The dispersion structures 320 and 322 may include gaps sized to cause capillary action to move water away from the respective lenses. For example, the image capture device 300 may include water dispersion structures shown in the lens mount 400 of FIG. 4. In some implementations, an outer surface of the lenses 330 and 332 have a radial hydrophobicity gradient from a center of the lens to a perimeter of the lens. For example, lenses 330 and 332 may have a radial hydrophobicity gradient as shown in one of the hydrophobicity plots of FIG. 7.

Figure 3B:
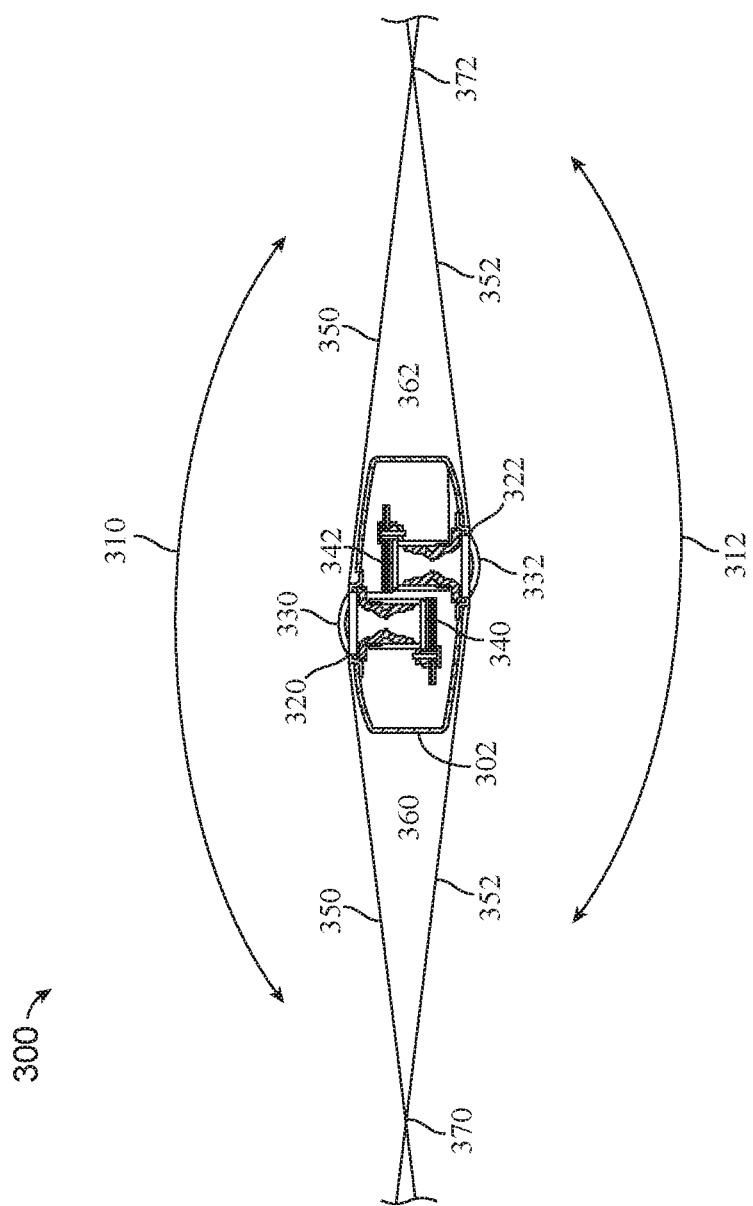
FIG. 3B is a cross-sectional view of an example of an image capture apparatus including overlapping fields-of-view.

FIG. 3B is a cross-sectional view of an example of a dual-lens image capture device 300 including overlapping fields-of-view 310, 312. In some implementations, the image capture device 300 may be a spherical image capture apparatus with fields-of-view 310, 312 as shown in FIG. 3. The image capture device 300 includes a first image sensor 340 mounted within the body 302, behind the first lens 330 and configured to capture images based on light incident on the first image sensor 340 through the first lens 330. The image capture device 300 includes a second image sensor 342 mounted within the body 302, behind the second lens 332 and configured to capture images based on light incident on the second image sensor 342 through the second lens 332. The first image sensor 340 and the second image sensor 342 may be arranged in a back-to-back or Janus configuration. The lenses 330 and 332 may be mounted on the body 302 of the image capture device 300 in their respective positions in relation to the first image sensor 340 and the second image sensor 342.

The first lens 330 of the image capture device 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture device 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the respective image sensors 340, 342, and content in the blind spots 360, 362 may be omitted from capture. In some implementations, the image capture device 300 may be configured to minimize the blind spots 360, 362.

In some implementations, the fields-of-view 310, 312 may overlap. Stitch points 370, 372, proximal to the image capture device 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image sensors 340, 342, such as the locations of the stitch points 370, 372, may decrease the accuracy, efficiency, or both of generating a combined image. In some implementations, the image capture device 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1°, 2°, 3°, and/or other tolerances. In some implementations, the image sensors 340, 342 may be substantially perpendicular to the optical axes through their respective lenses 330, 332, such that the image sensors may be perpendicular to the respective axes to within a tolerance such as 1°, 2°, 3°, and/or other tolerances.

In some implementations, the lenses 330, 332 may be laterally offset from each other, may be off-center from a central axis of the image capture device 300, or may be laterally offset and off-center from the central axis. As compared to an image capture apparatus with back-to-back lenses (e.g., lenses aligned along the same axis), the image capture device 300 including laterally offset lenses 330, 332 may include substantially reduced thickness relative to the lengths of the lens barrels securing the lenses 330, 332. For example, the overall thickness of the image capture device 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture device 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4:
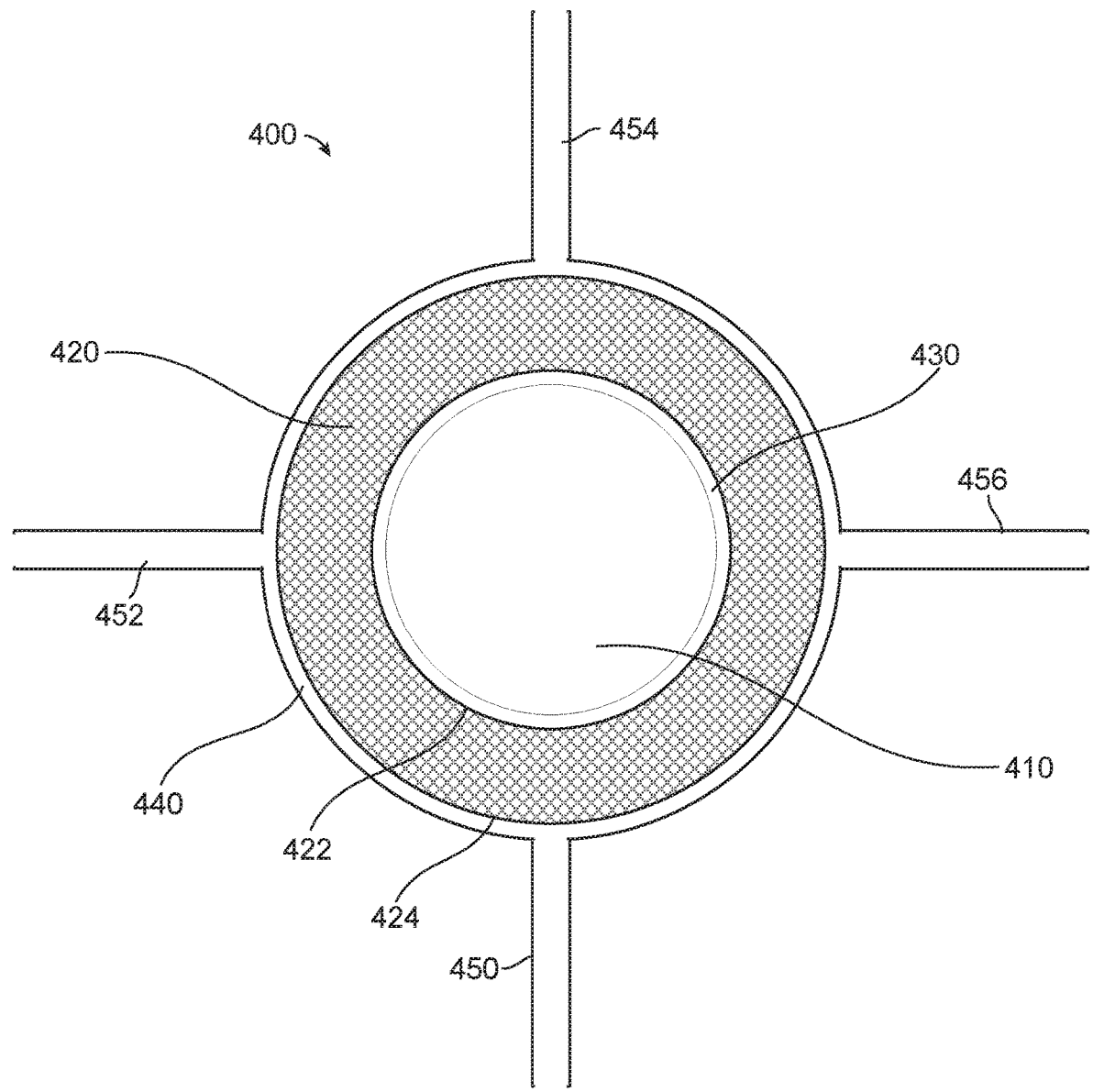
FIG. 4 illustrates a top-down view of an example of a lens mount with water dispersion structures.

FIG. 4 illustrates a top-down view of an example of a lens mount 400 with water dispersion structures. The lens mount 400 may be mounted on a body of an image capture device (e.g., the image capture device 130 or the image capture device 300). The lens mount 400 includes a lens 410; a dispersion structure 420 around a perimeter of the lens on an external surface of the body; a first accumulation volume 430 on the external surface of the body around the perimeter of the lens, between the lens and the dispersion structure; a second accumulation volume 440 on the external surface of the body around the perimeter of the dispersion structure; and gravity channels (450, 452, 454, and 456) connected to the accumulation volume.

The lens mount 400 includes a lens 410 mounted on a body (e.g., the body 302) of an image capture device. In this example of FIG. 4, the lens 410 is a spherical lens (e.g., a hyper-hemispherical lens) with a circular cross-section in a plane of an external surface of the body of image capture device (e.g., the plane depicted in FIG. 4). In some implementations (not shown), the lens 410 may be replaced with a lens with a different shape in this plane, such as rectangular shaped cross-section. The lens 410 may be mounted over a hole in the body, in front of an image sensor. The image sensor may be mounted within the body, behind the lens 410 and configured to capture images based on light incident on the image sensor through the lens 410. In some implementations, an outer surface of the lens 410 is substantially hydrophilic, which may reduce image degradation in foggy environments by reducing the formation of tiny water droplets on the outer surface of the lens 410. In some implementations, an outer surface of the lens is substantially hydrophobic, which may reduce image degradation in environments where large water droplets are likely to form on the surface (e.g., due to rain or splashing water) by repelling large water droplets, causing the droplets to slide off the outer surface of the lens 410. In some implementations, an outer surface of the lens 410 has a radial hydrophobicity gradient from a center of the lens 410 to the perimeter of the lens 410. For example, a hydrophobicity of the outer surface of the lens 410 may be greater in the center of the lens 410 than at the perimeter of the lens 410 to encourage the water droplets to migrate towards the outer perimeter of the lens 410. For example, an outer surface of the lens 410 may have a radial hydrophobicity gradient as shown in one of the hydrophobicity plots of FIG. 7.

The lens mount 400 includes a dispersion structure 420 around a perimeter of the lens 410 on an external surface of the body (e.g., the body 302). The dispersion structure includes gaps sized to cause capillary action to move water away from the lens, from a first edge 422 of the dispersion structure to a second edge 424 of the dispersion structure. For example, the first edge 422 may be adjacent to or near the perimeter of the lens 410 and the second edge 424 may be farther from perimeter of the lens 410. In some implementations, the dispersion structure 420 includes tubes with a cross-sectional area sized to cause capillary action for water. For example, the dispersion structure 420 may include the tubes 500 of FIG. 5A. In some implementations, the dispersion structure 420 includes grooves on the external surface of the body and the width, depth, and/or hydrophilic surface treatment of the grooves are selected to cause capillary action for water. For example, the dispersion structure 420 may include the grooves 530 of FIG. 5B. In some implementations, the dispersion structure 420 includes a mesh (e.g., a screen) with an inter-strand spacing that is sized to cause capillary action for water. The mesh may be made of a hydrophilic material. For example, the dispersion structure 420 may include the mesh 560 of FIG. 5C. In some implementations, the dispersion structure 420 includes a sintered powder with a pore distribution sized to cause capillary action for water. For example, the dispersion structure 420 may include the sintered powder 590 of FIG. 5D. The first edge 422 of the dispersion structure 420 may be near the perimeter of the lens 410, adjacent to the first accumulation volume 430. In some implementations (not shown), the first accumulation volume is omitted and the first edge 422 of the dispersion structure 420 may be adjacent to the perimeter of the lens 410.

The lens mount 400 includes an accumulation volume 430 on the external surface of the body (e.g., the body 302) around the perimeter of the lens 410, between the lens 410 and the dispersion structure 420. The accumulation volume 430 may be adjacent to the lens 410. The accumulation volume 430 may be a channel around the perimeter of the lens 410 on the external surface of the body. The accumulation volume 430 may have a hydrophilic surface to attract water running off the lens 410. For example, a surface of the accumulation volume 430 may be hydrophilic relative to the outer surface of the lens 410. The first accumulation volume 430 may serve as buffer to store water after it runs off the lens 410 while it waits to be moved away via capillary action through the dispersion structure 420.

The lens mount 400 includes an accumulation volume 440 on the external surface of the body (e.g., the body 302) around the perimeter of the dispersion structure 420. The accumulation volume 440 may be a channel around the perimeter of the lens 410 on the external surface of the body. The accumulation volume 440 may have a hydrophilic surface to attract water output from the dispersion structure 420 at the second edge 424. The second accumulation volume 440 may serve as buffer to store water after it is output from the dispersion structure 420 while it waits to be drained away via one of the gravity channels (450, 452, 454, and 456) and/or evaporated.

The lens mount 400 includes one or more gravity channels (450, 452, 454, and 456) connected to the accumulation volume 440, that are configured to allow water to flow out of the accumulation volume 440 under a force of gravity when the image capture device is in an appropriate orientation with respect to gravity. For example, the gravity channels (450, 452, 454, and 456) may be channels on the external surface of the body. The accumulation volume 440 is around the perimeter of the dispersion structure 420 and thus around the perimeter of the lens 410. In some implementations (not shown), the dispersion structure may be omitted and the first accumulation volume 430 and the second accumulation volume 440 may be combined in a single accumulation volume around the perimeter of the lens 410 and adjacent to the lens 410, and the gravity channels (450, 452, 454, and 456) may be configured to drain water from this combined accumulation volume. The lens mount 400 includes a plurality of gravity channels (450, 452, 454, and 456) radiating from the accumulation volume 440 that are spaced around an outer perimeter of the accumulation volume 440. In the example of FIG. 4, the plurality of gravity channels includes four gravity channels 450, 452, 454, and 456 spaced evenly around the outer perimeter of the accumulation volume 440. Spacing the gravity channels around the perimeter of the accumulation volume 440 may increase the chance that at least one of the gravity channels (450, 452, 454, and 456) is able to effectively drain water from the accumulation volume 440 when the image capture device is in a random orientation.

FIG. 5A illustrates an example of tubes 500 with dimensions chosen to cause capillary action. The tubes 500 may extend from a first edge (e.g., the first edge 422) of a dispersion structure (e.g., the dispersion structure 420) to a second edge (e.g., the second edge 424) of the dispersion structure. The tubes 500 include a first tube 510, a second tube 512, and possibly more tubes (not shown) running through the dispersion structure. The tubes 500 have gaps sized to cause capillary action to move water away from a lens (e.g., the lens 410). The first tube 510 has a gap 520 with a diameter D. The second tube 512 has a gap 522 with a diameter D. The gap 520 and the gap 522 may have a cross-sectional area (e.g., $A=\pi D^2/4$) sized to cause capillary action for water. For example, diameter D may be 1 micrometer, 10 micrometers, or 100 micrometers. In some implementations (not shown), the tubes 500 can have differently shaped gaps (e.g., the gaps may have rectangular cross-sectional areas). In some implementations (not shown), the tubes 500 can be gaps carved into solid blocks or slabs of material (e.g. plastic or stainless steel).

Figure 5B:
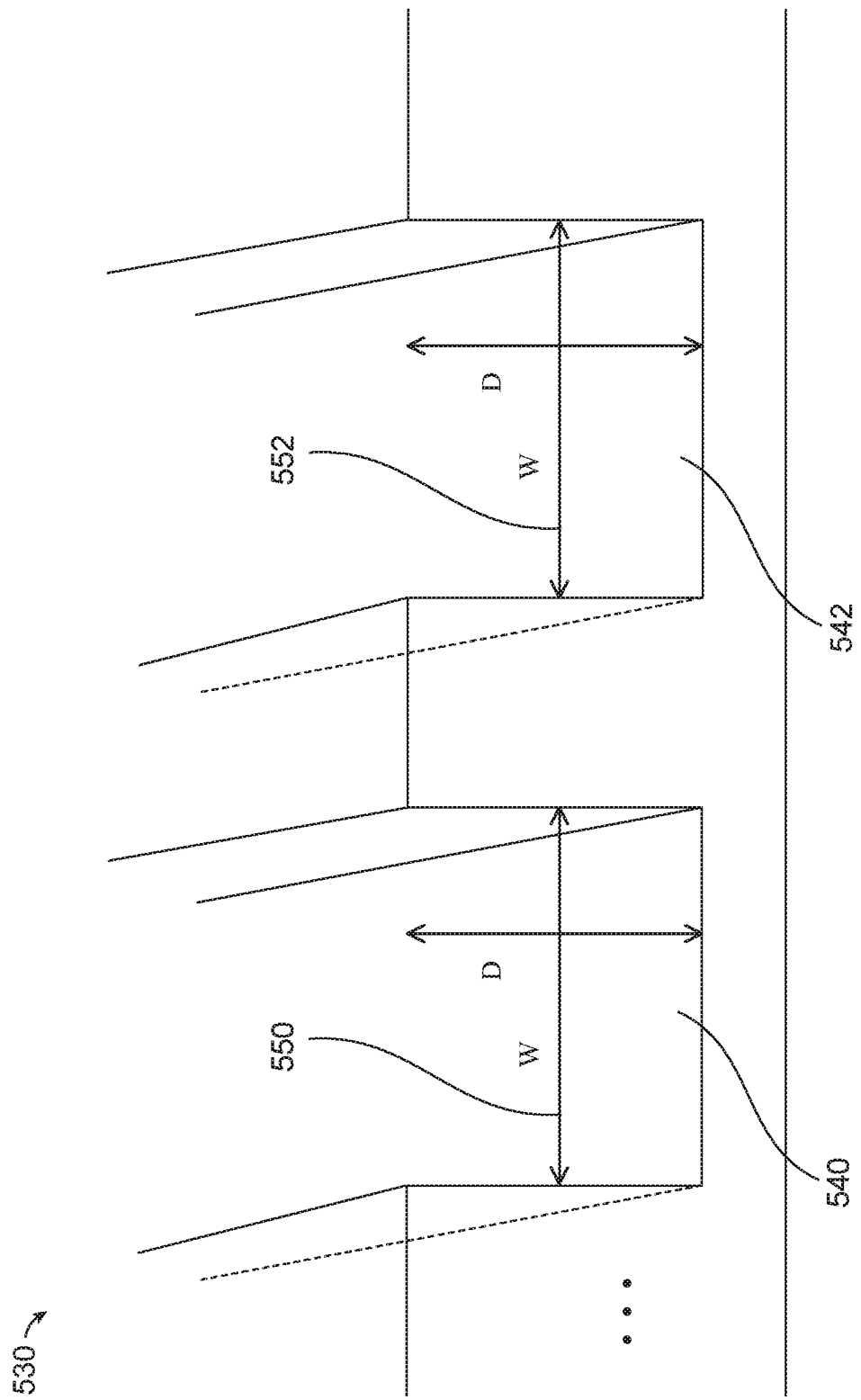
FIG. 5B illustrates an example of grooves with dimensions chosen to cause capillary action.

FIG. 5B illustrates an example of grooves 530 with dimensions chosen to cause capillary action. The grooves 530 may extend from a first edge (e.g., the first edge 422) of a dispersion structure (e.g., the dispersion structure 420) to a second edge (e.g., the second edge 424) of the dispersion structure. The grooves 530 include a first groove 540, a second groove 542, and possibly more grooves (not shown) running through the dispersion structure. The grooves 530 have gaps sized to cause capillary action to move water away from a lens (e.g., the lens 410). The first groove 540 has a gap 550 with a width W and a depth D. The second groove 542 has a gap 552 with a width W and a depth D. The gap 550 and the gap 552 may have a width (e.g., W) and a depth (e.g., D) that are sized to cause capillary action for water. For example, the width W may be 1 micrometer, 10 micrometers, or 100 micrometers. For example, the depth D may be 1 micrometer, 10 micrometers, or 100 micrometers. In some implementations (not shown), the grooves 530 can have differently shaped gaps (e.g., the gaps may have semi-circular, V-shaped, trapezoidal, or irregularly shaped cross-sectional areas). In some implementations, the grooves 530 can be gaps carved into solid blocks or slabs of material (e.g. plastic or stainless steel). For example, the surface of the grooves 530 may be hydrophilic.

Figure 5C:
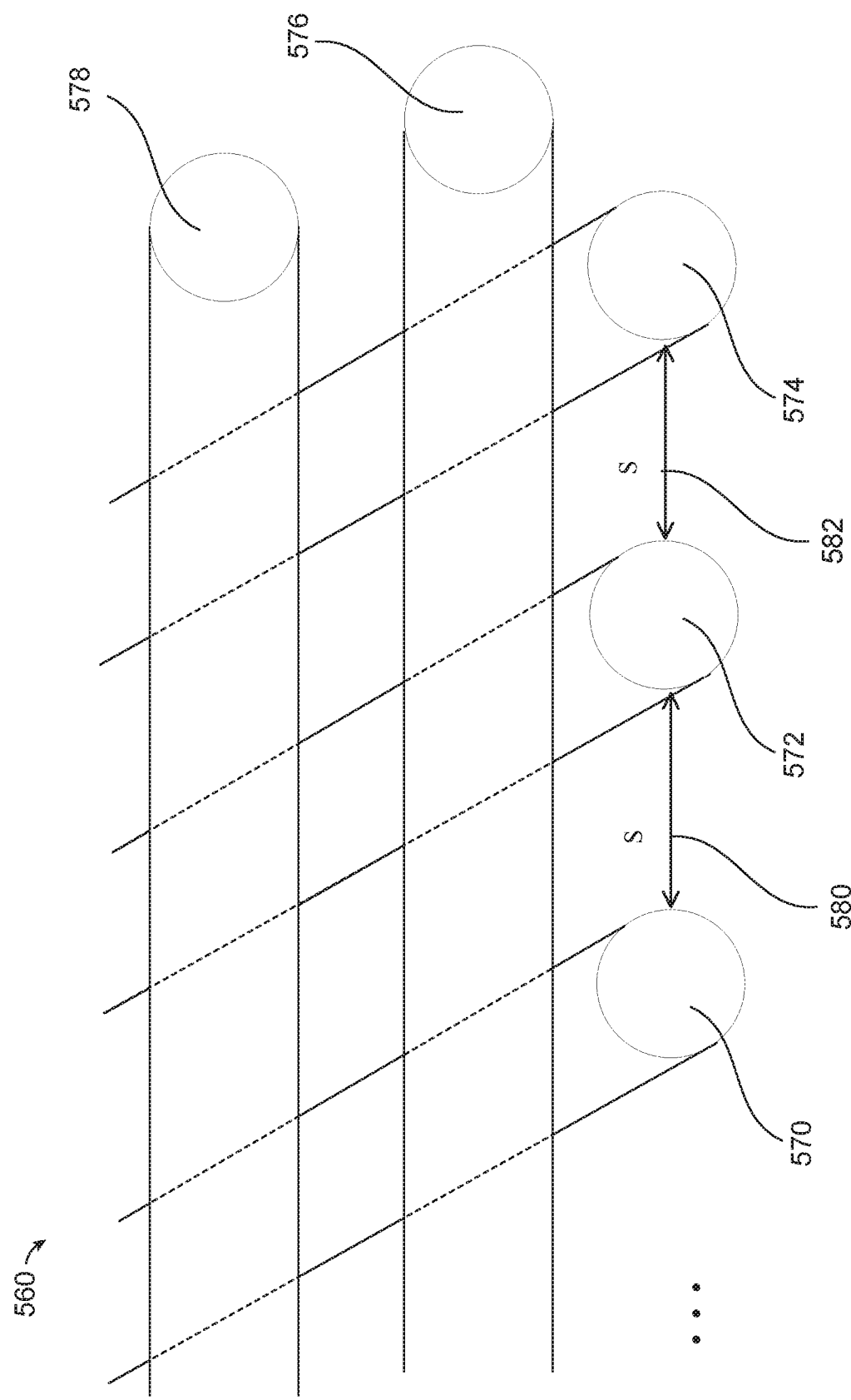
FIG. 5C illustrates an example of a mesh with dimensions chosen to cause capillary action.

FIG. 5C illustrates an example of a mesh 560 with dimensions chosen to cause capillary action. The mesh 560 may extend from a first edge (e.g., the first edge 422) of a dispersion structure (e.g., the dispersion structure 420) to a second edge (e.g., the second edge 424) of the dispersion structure. The mesh 560 includes a first strand 570, a second strand 572, a third strand 574, and possibly more strands (not shown) running through the dispersion structure. The mesh 560 includes a first cross-strand 576, a second cross-strand 578, and possibly more cross-strands (not shown) running across the dispersion structure. The mesh 560 has gaps sized to cause capillary action to move water away from a lens (e.g., the lens 410). There is a gap 580 between the first strand 570 and the second strand 572 with an inter-strand spacing S. There is a gap 582 between the second strand 572 and the third strand 574 with an inter-strand spacing S. The gap 580 and the gap 582 may have inter-strand spacing (e.g., S) that is sized to cause capillary action for water. For example, the inter-strand spacing S may be 1 micrometer, 10 micrometers, or 100 micrometers. In some implementations (not shown), the mesh 560 can have differently shaped stands (e.g., the strands may have rectangular cross-sectional areas). In some implementations, the strands can be made of hydrophilic cloth, fiberglass, plastic or metal.

Figure 5D:
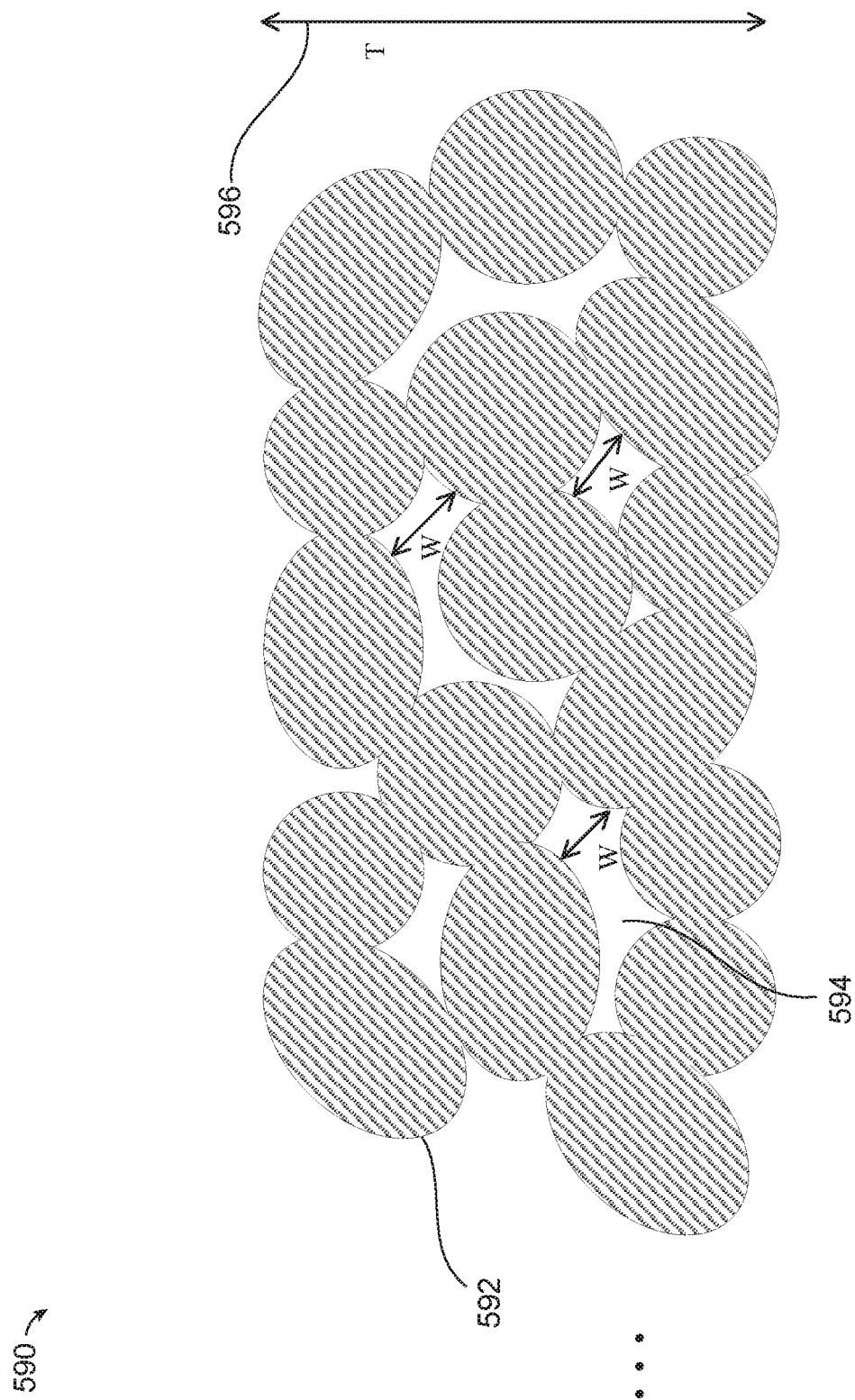
FIG. 5D illustrates an example of a sintered powder with dimensions chosen to cause capillary action.

FIG. 5D illustrates an example of a sintered powder 590 with dimensions chosen to cause capillary action. The sintered powder 590 may extend from a first edge (e.g., the first edge 422) of a dispersion structure (e.g., the dispersion structure 420) to a second edge (e.g., the second edge 424) of the dispersion structure, where FIG. 5D illustrates a view of the first edge from the perspective of a point on the perimeter of a lens. The sintered powder 590 includes many particles, such the particle 592, that have been fused together with a sintering process forming a structure with gaps called pores, such as the pore 594. The pores of the sintered powder 590 may be sized to cause capillary action to move water away from a lens (e.g., the lens 410). For example, the pores may have a distribution of widths (W) averaging approximately 30 micrometers or 40 micrometers. For example, the porosity of the sintered powder may be 50% or 60%. The particles of the sintered powder 590 may be made of various materials, such as plastic, ceramic, or metal (e.g., copper). In this example, the sintered powder 590 has a thickness 596

(T) corresponding the widths of a few particles. In some implementations, the surface of the sintered powder 590 may be hydrophilic.

In some implementations (not shown in FIGS. 5A-5D), a dispersion structure (e.g., the dispersion structure 420) may include a flat outer surface that may reduce the likelihood that dirt and debris from the environment that will be deposited in the features (e.g., gaps) of the dispersion structure during use of the image capture device. For example, the tubes 500 may be sandwiched between two plates (e.g., metal or plastic plates) to present a smooth surface to outside environment and to users, which may be more aesthetically pleasing. For example, the tubes 500 may be formed as channels carved through a solid slab of material (e.g., metal or plastic) that is smooth on the two largest area sides. For example, the tubes 500 may be formed as channels through the bulk of a lens retainer ring. For example, the mesh 560 may be sandwiched between two plates (e.g., metal or plastic plates) to present a smooth surface to outside environment and to users, which may be more aesthetically pleasing. For example, the sintered powder 590 may be sandwiched between two plates (e.g., metal or plastic plates) to present a smooth surface to outside environment and to users, which may be more aesthetically pleasing. In some implementations, a spacing between an outer plate of a dispersion structure and an inner plate may be sized cause capillary action for water.

Figure 6B:
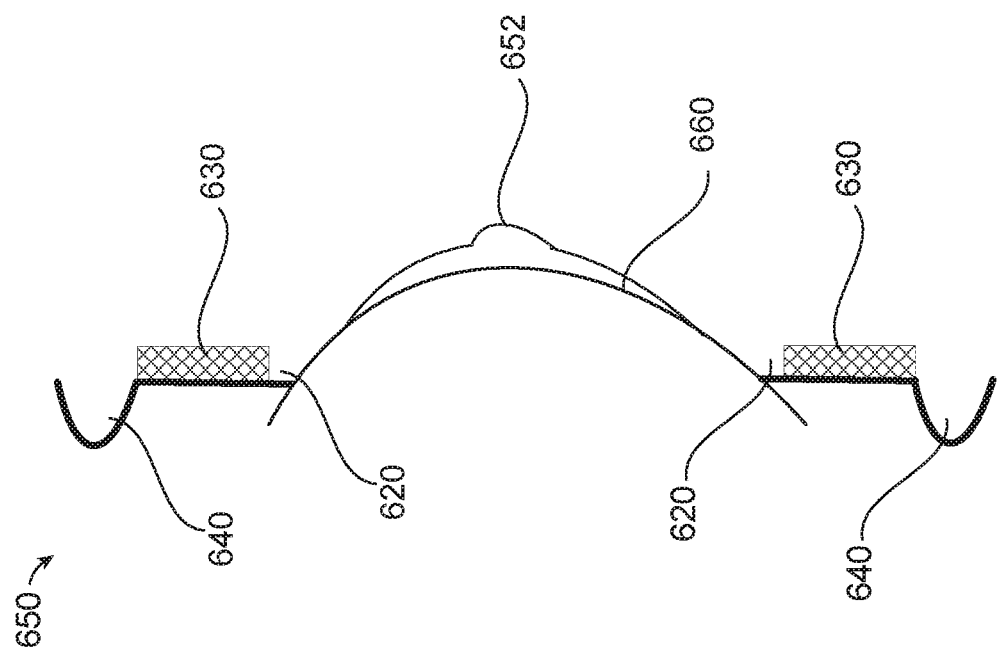
FIG. 6B illustrates a side view of an example of a lens with dispersion structures showing water on a hydrophilic lens surface.
Figure 6A:
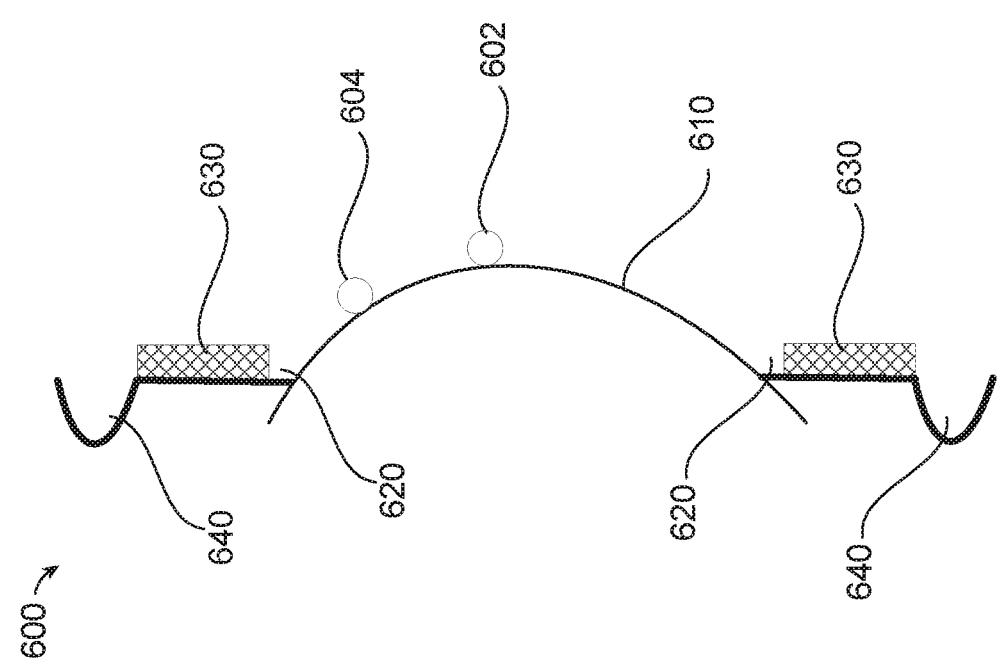
FIG. 6A illustrates a side view of an example of a lens with dispersion structures showing water on a hydrophobic lens surface.

FIG. 6A illustrates a side view of an example of a lens with dispersion structures 600 showing water on a hydrophobic lens surface. Water droplets 602 and 604 bead up on a hydrophobic outer surface of the lens 610. The water droplets 602 and 604 may slide across the surface of the lens 610, away from the center of the lens 610 and towards an accumulation volume 620 around the lens 610, adjacent to the perimeter of the lens 610. In some implementations, the surface of the lens 610 may have a hydrophobicity gradient (e.g., as described in relation to FIG. 7) that may facilitate to sliding of the water droplets 602 and 604 away from the center of the lens 610. The accumulation volume 620 may have a hydrophilic surface that distributes water entering the accumulation volume 620 around the accumulation volume 620, where it accumulates until it is moved away from the lens 610 via capillary action through gaps in the dispersion structure 630 that is adjacent to the accumulation volume 620. Water is moved through the dispersion structure 630 from the first accumulation volume 620 to a second accumulation volume 640 where it can be stored until it evaporates and/or is drained away through a gravity channels under the force of gravity.

FIG. 6B illustrates a side view of an example of a lens with dispersion structures 650 showing water on a hydrophilic lens surface. A water droplet 652 on the lens 660 is spread out across an outer surface of lens 660 that is hydrophilic. Spreading the water evenly across the surface of the lens 660 may reduce the uneven refraction of light passing through the lens 660 and associated degradation of images. As the water is spread out to the perimeter of the lens 660, the water is drawn into an accumulation volume 620 with a higher hydrophilicity than the surface of the lens 660. In some implementations, the surface of the lens 660 may have a hydrophilicity/hydrophobicity gradient (e.g., as described in relation to FIG. 7) that may facilitate the movement of water away from the center of the lens 660. The accumulation volume 620 may have a hydrophilic surface that distributes water entering the accumulation volume 620 around the accumulation volume 620, where it accumulates until it is moved away from the lens 660 via capillary action through gaps in the dispersion structure 630 that is adjacent to the accumulation volume 620. Water is moved through the dispersion structure 630 from the first accumulation volume 620 to a second accumulation volume 640 where it can be stored until it evaporates and/or is drained away through a gravity channels under the force of gravity.

Figure 7:
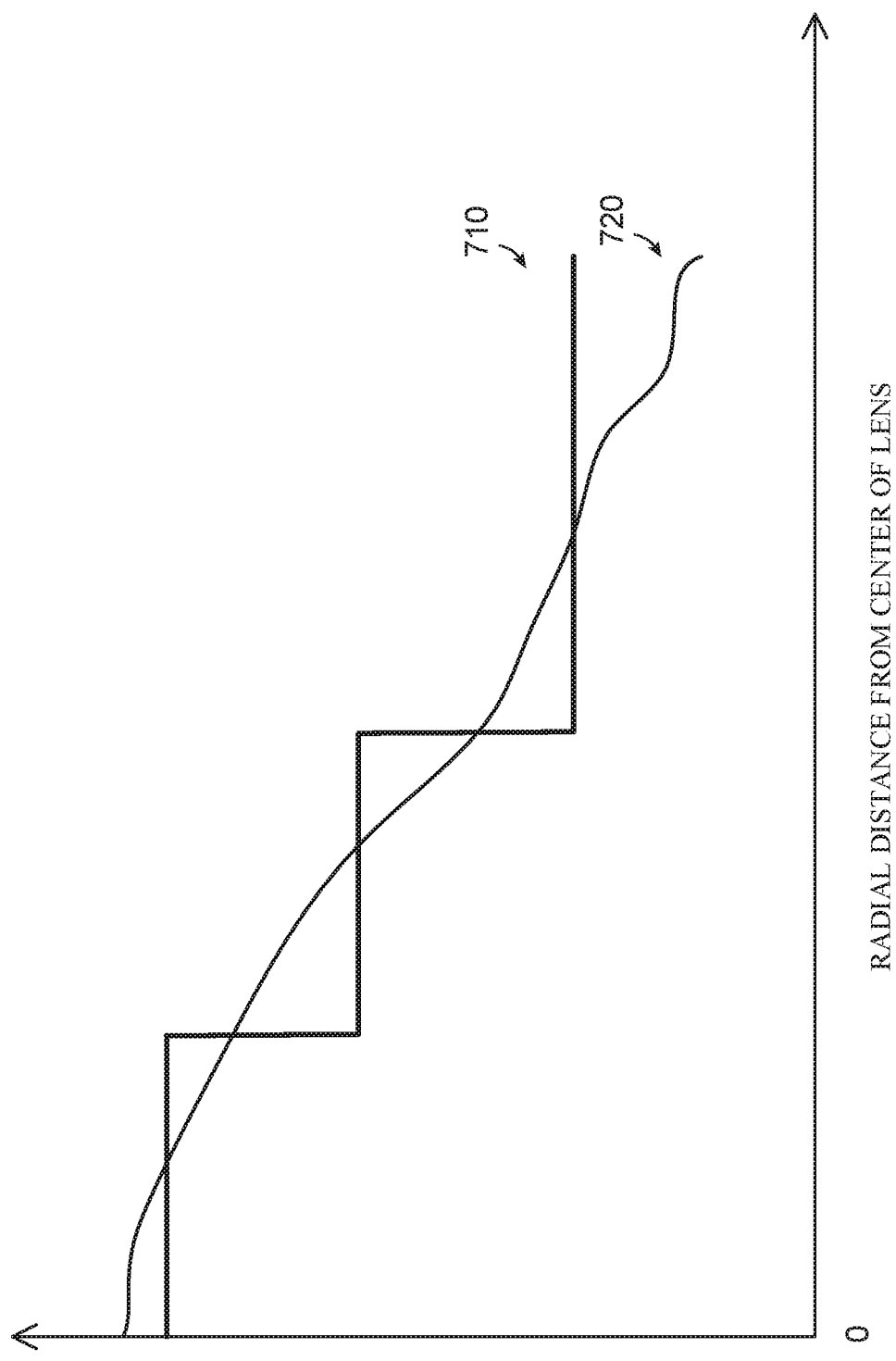
FIG. 7 is a sketch/plots of radial hydrophobicity gradients across a lens surface.

FIG. 7 is a sketch/plots of radial hydrophobicity gradients across a lens surface. The horizontal axis of the plots corresponds to radial distance from a center of a lens. The vertical axis of the plots corresponds to hydrophobicity of an outer surface of the lens. The first plot 710 shows a hydrophobicity that decreases in discrete steps or bands as the position moves out from the center to a perimeter of the lens. The second plot 720 shows a hydrophobicity that decreases continuously as the position moves out from the center to a perimeter of the lens. In these examples, the hydrophobicity of the outer surface of the lens is greater in the center of the lens than at the perimeter of the lens. For both plots 710 and 720, the hydrophobicity takes a maximum value at the center of the lens and decreases monotonically. For the lens surface of the first plot 710, the radial hydrophobicity gradient is implemented a sequence if discrete steps in hydrophobicity. For the lens surface of the second plot 720, the radial hydrophobicity gradient is continuous. In both cases, the resulting radial hydrophobicity gradient may facilitate the flow of water away from the center of the lens and toward the perimeter of the lens. Taking water away from the center of the lens may facilitate drainage at the perimeter of the lens and may also improve image quality by reducing distortion in the center portions of captured images.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration. For example, the lens water dispersion systems and techniques described herein may be applied to any number of lenses on an image capture device, such as multiple lenses for depth capture, or potentially to allow shorter TTL lenses (with smaller image sensors) that are then fused together to create the total light gathering power of a larger sensor/lens combination.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy.

The above-described implementations and examples have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:
1. An image capture device comprising:
  a lens mounted on a body of the image capture device;
  an image sensor mounted within the body, behind the lens and configured to capture images based on light incident on the image sensor through the lens; and a dispersion structure around a perimeter of the lens on an external surface of the body, wherein the dispersion structure includes gaps sized to cause capillary action to move water away from the lens, from a first edge of the dispersion structure to a second edge of the dispersion structure, in which an outer surface of the lens has a radial hydrophobicity gradient from a center of the lens to the perimeter of the lens.

2. The image capture device of claim 1, in which the dispersion structure includes grooves on the external surface of the body and width of the grooves are sized to cause capillary action for water.

3. The image capture device of claim 1, in which the dispersion structure includes tubes with a cross-sectional area sized to cause capillary action for water.

4. The image capture device of claim 1, in which the dispersion structure includes a mesh with an inter-strand spacing that is sized to cause capillary action for water.

5. The image capture device of claim 1, in which the dispersion structure includes a sintered powder with pores that are sized to cause capillary action for water.

6. The image capture device of claim 1, in which an outer surface of the lens is substantially hydrophilic.

7. The image capture device of claim 1, in which an outer surface of the lens is substantially hydrophobic.

8. The image capture device of claim 1, in which hydrophobicity of the outer surface of the lens is greater in the center of the lens than at the perimeter of the lens.

9. The image capture device of claim 1, comprising:
an accumulation volume on the external surface of the body around the perimeter of the lens, between the lens and the dispersion structure.

10. The image capture device of claim 9, in which the accumulation volume is a channel around the perimeter of the lens on the external surface of the body.

11. The image capture device of claim 1, comprising:
an accumulation volume on the external surface of the body around the perimeter of the dispersion structure.

12. The image capture device of claim 11, comprising:
one or more gravity channels connected to the accumulation volume, that are configured to allow water to flow out of the accumulation volume under a force of gravity when the image capture device is in an appropriate orientation with respect to gravity.

13. An image capture device comprising:
a lens mounted on a body of the image capture device;
an image sensor mounted within the body, behind the lens and configured to capture images based on light incident on the image sensor through the lens; and
wherein an outer surface of the lens has a radial hydrophobicity gradient from a center of the lens to a perimeter of the lens.

14. The image capture device of claim 13, in which hydrophobicity of the outer surface of the lens is greater in the center of the lens than at the perimeter of the lens.

15. The image capture device of claim 13, in which the radial hydrophobicity gradient is continuous.

16. The image capture device of claim 13, in which the radial hydrophobicity gradient is implemented a sequence of discrete steps in hydrophobicity.

17. The image capture device of claim 13, comprising:
an accumulation volume on an external surface of the body around the perimeter of the lens, adjacent to the lens.

18. The image capture device of claim 17, in which a surface of the accumulation volume is hydrophilic relative to the outer surface of the lens.

19. An image capture device comprising:
a lens mounted on a body of the image capture device;
an image sensor mounted within the body, behind the lens and configured to capture images based on light incident on the image sensor through the lens;
an accumulation volume on an external surface of the body around a perimeter of the lens; and
a plurality of gravity channels radiating from the accumulation volume that are spaced around an outer perimeter of the accumulation volume.

20. The image capture device of claim 19, in which the plurality of gravity channels includes four gravity channels spaced evenly around the outer perimeter of the accumulation volume.

* * * * *